United States Patent
Katzer et al.

(10) Patent No.: US 8,863,252 B1
(45) Date of Patent: *Oct. 14, 2014

(54) TRUSTED ACCESS TO THIRD PARTY APPLICATIONS SYSTEMS AND METHODS

(75) Inventors: Robin D. Katzer, Olathe, KS (US); Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,213

(22) Filed: Jul. 25, 2012

(51) Int. Cl.
*G06F 7/00* (2006.01)

(52) U.S. Cl.
USPC ............. 726/5; 726/1; 726/3; 726/6; 726/18; 726/22; 726/23; 726/24; 705/71; 709/206; 709/224

(58) Field of Classification Search
CPC .... H04N 21/4126; H04L 67/20; H04L 67/22; H04L 63/10; H04L 9/3234; H04L 9/3263; H04L 2463/102; H04L 29/08; H04L 65/607; G06F 21/572; G06F 21/606
USPC ............... 726/6, 2, 12, 1, 3, 5, 18, 22, 23, 24; 713/169, 175, 152, 168, 171, 172; 709/219, 226, 217, 206, 224; 455/411; 705/71
See application file for complete search history.

(56) References Cited

U.S. PATENT DOCUMENTS

| | | | |
|---|---|---|---|
| 5,303,378 | A | 4/1994 | Cohen |
| 6,219,712 | B1 | 4/2001 | Mann et al. |
| 6,668,322 | B1 | 12/2003 | Wood et al. |
| 6,823,454 | B1 | 11/2004 | Hind et al. |
| 6,824,064 | B2 | 11/2004 | Guthery et al. |

(Continued)

FOREIGN PATENT DOCUMENTS

| | | |
|---|---|---|
| WO | 13170228 A2 | 11/2013 |
| WO | 2014004590 A2 | 1/2014 |
| WO | 2014018575 A2 | 1/2014 |
| WO | 2014025687 A2 | 2/2014 |

OTHER PUBLICATIONS

FAIPP Pre-Interview Communication dated Oct. 24, 2012, U.S. Appl. No. 13/463,797, filed May 3, 2012.

(Continued)

*Primary Examiner* — Beemnet Dada
*Assistant Examiner* — Sayed Beheshti Shirazi

(57) ABSTRACT

A method of downloading trusted content. The method comprises sending by a mobile device a request for a trusted content to a server, wherein the mobile device comprises a first mobile device trusted security zone and builds the request while executing in the first mobile device trusted security zone and wherein the server comprises a server trusted security zone and wherein the server handles the request for the trusted content at least partly in the server trusted security zone. The method comprises receiving the trusted content by the first mobile device trusted security zone, storing the trusted content in a second mobile device trusted security zone of the mobile device, inspecting the trusted content in the second mobile device trusted security zone, and when the trusted content passes inspection, at least one of executing or presenting a portion of the trusted content by the first mobile device trusted security zone.

18 Claims, 8 Drawing Sheets

(56) References Cited

U.S. PATENT DOCUMENTS

| | | |
|---|---|---|
| 6,895,234 B1 | 5/2005 | Laursen et al. |
| 7,650,645 B1 | 1/2010 | Langendorf et al. |
| 7,873,837 B1 | 1/2011 | Lee et al. |
| 7,895,642 B1 | 2/2011 | Larson et al. |
| 8,238,823 B2 | 8/2012 | Maugars et al. |
| 8,402,543 B1 | 3/2013 | Ranjan et al. |
| 8,429,409 B1 | 4/2013 | Wall et al. |
| 8,443,420 B2 | 5/2013 | Brown et al. |
| 8,494,576 B1 | 7/2013 | Bye et al. |
| 8,504,097 B1 | 8/2013 | Cope et al. |
| 8,649,770 B1 | 2/2014 | Cope et al. |
| 8,667,607 B2 | 3/2014 | Paczkowski et al. |
| 8,712,407 B1 | 4/2014 | Cope et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 2002/0095389 A1 | 7/2002 | Gaines |
| 2002/0156911 A1 | 10/2002 | Croman et al. |
| 2002/0174344 A1 | 11/2002 | Ting |
| 2002/0184325 A1* | 12/2002 | Killcommons et al. ...... 709/206 |
| 2002/0194361 A1 | 12/2002 | Itoh et al. |
| 2002/0194496 A1 | 12/2002 | Griffin et al. |
| 2003/0126225 A1 | 7/2003 | Camble et al. |
| 2003/0237002 A1 | 12/2003 | Oishi et al. |
| 2004/0233844 A1 | 11/2004 | Yu et al. |
| 2004/0243810 A1 | 12/2004 | Ringborg et al. |
| 2005/0015601 A1 | 1/2005 | Tabi |
| 2005/0138433 A1 | 6/2005 | Linetsky |
| 2005/0235166 A1 | 10/2005 | England et al. |
| 2006/0036851 A1 | 2/2006 | DeTreville |
| 2006/0156026 A1 | 7/2006 | Utin |
| 2006/0190605 A1 | 8/2006 | Franz et al. |
| 2006/0212853 A1 | 9/2006 | Sutardja |
| 2006/0224901 A1 | 10/2006 | Lowe |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0014867 A1 | 1/2008 | Finn |
| 2008/0022374 A1 | 1/2008 | Brown et al. |
| 2008/0092213 A1 | 4/2008 | Wei et al. |
| 2008/0097793 A1 | 4/2008 | Dicks et al. |
| 2008/0121687 A1 | 5/2008 | Buhot |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0212503 A1 | 9/2008 | Lipford et al. |
| 2009/0055278 A1 | 2/2009 | Nemani |
| 2009/0070272 A1 | 3/2009 | Jain |
| 2009/0089449 A1 | 4/2009 | Day |
| 2009/0113425 A1 | 4/2009 | Ports et al. |
| 2009/0182634 A1 | 7/2009 | Park et al. |
| 2009/0193491 A1* | 7/2009 | Rao ................... 726/1 |
| 2009/0281947 A1 | 11/2009 | Erel |
| 2009/0300599 A1* | 12/2009 | Piotrowski ............ 717/174 |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0082977 A1 | 4/2010 | Boyle et al. |
| 2010/0128598 A1 | 5/2010 | Gandhewar et al. |
| 2010/0142517 A1 | 6/2010 | Montemurro et al. |
| 2010/0153721 A1* | 6/2010 | Mellqvist ................ 713/168 |
| 2010/0162028 A1 | 6/2010 | Frank et al. |
| 2010/0198943 A1 | 8/2010 | Harrang et al. |
| 2010/0223348 A1 | 9/2010 | Przybysz et al. |
| 2010/0228937 A1 | 9/2010 | Bae et al. |
| 2010/0241847 A1* | 9/2010 | van der Horst et al. ....... 713/152 |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0281139 A1 | 11/2010 | Deprun |
| 2010/0299313 A1 | 11/2010 | Orsini et al. |
| 2010/0318802 A1* | 12/2010 | Balakrishnan ............... 713/172 |
| 2011/0014948 A1 | 1/2011 | Yeh |
| 2011/0021175 A1 | 1/2011 | Florek et al. |
| 2011/0035604 A1 | 2/2011 | Habraken |
| 2011/0055084 A1 | 3/2011 | Singh |
| 2011/0078081 A1 | 3/2011 | Pirzadeh et al. |
| 2011/0082711 A1 | 4/2011 | Poeze et al. |
| 2011/0112968 A1 | 5/2011 | Floreck et al. |
| 2011/0113479 A1 | 5/2011 | Ganem |
| 2011/0154032 A1 | 6/2011 | Mauro, II |
| 2011/0202916 A1 | 8/2011 | VoBa et al. |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238992 A1* | 9/2011 | Jancula et al. ............... 713/168 |
| 2011/0246609 A1 | 10/2011 | Kim |
| 2011/0251892 A1 | 10/2011 | Laracey |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1* | 4/2012 | Mahaffey et al. ................. 726/3 |
| 2012/0089700 A1 | 4/2012 | Safruti et al. |
| 2012/0123868 A1* | 5/2012 | Brudnicki et al. ......... 705/14.58 |
| 2012/0130839 A1* | 5/2012 | Koh et al. ................... 705/26.1 |
| 2012/0131178 A1 | 5/2012 | Zhu et al. |
| 2012/0137119 A1 | 5/2012 | Doerr et al. |
| 2012/0143703 A1 | 6/2012 | Wall et al. |
| 2012/0149327 A1 | 6/2012 | Raboisson et al. |
| 2012/0158467 A1 | 6/2012 | Hammad et al. |
| 2012/0159163 A1 | 6/2012 | von Behren et al. |
| 2012/0159612 A1* | 6/2012 | Reisgies ........................ 726/18 |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0198519 A1 | 8/2012 | Parla et al. |
| 2012/0202423 A1 | 8/2012 | Tiedemann et al. |
| 2012/0226582 A1* | 9/2012 | Hammad ................. 705/26.41 |
| 2012/0226772 A1* | 9/2012 | Grube et al. ................ 709/217 |
| 2012/0238206 A1* | 9/2012 | Singh et al. ................. 455/41.1 |
| 2012/0252480 A1 | 10/2012 | Krutt et al. |
| 2012/0258690 A1* | 10/2012 | Chen et al. .................... 455/411 |
| 2012/0266076 A1 | 10/2012 | Lockhart et al. ............. 715/738 |
| 2012/0266220 A1* | 10/2012 | Brudnicki et al. ............... 726/6 |
| 2012/0284195 A1 | 11/2012 | McMillen et al. |
| 2012/0291095 A1 | 11/2012 | Narendra et al. |
| 2012/0295588 A1* | 11/2012 | Chen et al. .................... 455/411 |
| 2012/0297187 A1 | 11/2012 | Paya et al. |
| 2012/0303961 A1* | 11/2012 | Kean et al. ................... 713/171 |
| 2012/0304286 A1* | 11/2012 | Croll et al. ..................... 726/22 |
| 2012/0324293 A1* | 12/2012 | Grube et al. .................... 714/41 |
| 2013/0014259 A1* | 1/2013 | Gribble et al. .................. 726/24 |
| 2013/0035056 A1 | 2/2013 | Prasad et al. |
| 2013/0047197 A1* | 2/2013 | Saroiu et al. ...................... 726/1 |
| 2013/0054474 A1* | 2/2013 | Yeager ............................ 705/71 |
| 2013/0062417 A1 | 3/2013 | Lee et al. |

(56) References Cited

U.S. PATENT DOCUMENTS

| | | | |
|---|---|---|---|
| 2013/0086684 A1* | 4/2013 | Mohler | 726/24 |
| 2013/0097302 A9* | 4/2013 | Khedouri et al. | 709/224 |
| 2013/0109307 A1* | 5/2013 | Reisgies et al. | 455/41.1 |
| 2013/0117186 A1 | 5/2013 | Weinstein et al. | |
| 2013/0138521 A1* | 5/2013 | Want et al. | 705/26.1 |
| 2013/0138959 A1* | 5/2013 | Pelly et al. | 713/168 |
| 2013/0140360 A1 | 6/2013 | Graylin | |
| 2013/0143489 A1 | 6/2013 | Morris et al. | |
| 2013/0145429 A1 | 6/2013 | Mendel et al. | |
| 2013/0159186 A1* | 6/2013 | Brudnicki et al. | 705/44 |
| 2013/0159710 A1* | 6/2013 | Khan | 713/168 |
| 2013/0160120 A1* | 6/2013 | Malaviya et al. | 726/23 |
| 2013/0174147 A1 | 7/2013 | Sahita et al. | |
| 2013/0212704 A1 | 8/2013 | Shablygin et al. | |
| 2013/0263212 A1 | 10/2013 | Faltyn et al. | |
| 2013/0305333 A1 | 11/2013 | Katzer et al. | |
| 2013/0332456 A1 | 12/2013 | Arkin | |
| 2013/0345530 A1 | 12/2013 | McRoberts et al. | |
| 2014/0033316 A1 | 1/2014 | Paczkowski et al. | |
| 2014/0047548 A1 | 2/2014 | Bye et al. | |
| 2014/0188738 A1 | 7/2014 | Huxham | |

OTHER PUBLICATIONS

Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
FAIPP Pre-Interview Communication dated Jun. 6, 2013, U.S. Appl. No. 13/571,348, filed Aug. 10, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Cope, Warren B., et al., "Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980 .
Bye, Stephen James, et al., "Near Field Communication Authentication and Validation to Access Corporate Data", filed May 3, 2012, U.S. Appl. No. 13/463,801.
Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal", filed Nov. 11, 2011, U.S. Appl. No. 13/294,177.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method of Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.

(56) References Cited

OTHER PUBLICATIONS

Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Final Office Action dated Sep. 9, 2013, U.S. Appl. No. 13/440,980, filed Apr. 5, 2012.
Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Notice of Allowance dated Oct. 16, 2013, U.S. Appl. No. 13/556,200, filed Jul. 24, 2012.
Notice of Allowance dated Nov. 29, 2013, U.S. Appl. No. 13/440,980, filed Apr. 5, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
FAIPP, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
Notice of Allowance dated May 27, 2014, U.S. Appl. No. 13/482,731, filed on May 29, 2012.
Advisory Action dated May 29, 2014, U.S. Appl. No. 13/470,203, filed May 11, 2012
FAIPP Pre-Interview Communication dated May 12, U.S. Appl. No. 13/294,177, filed Nov. 11, 2011.
Final Office Action dated Apr. 10, 2014, U.S. Appl. No. 13/571,348, filed Aug. 10, 2012.
First Action Interview Office Action dated May 23, 2014, U.S. Appl. No. 13/802,383, filed Mar. 13, 2013.
Foreign Communication from a Related Counterpart—International Search Report and Written Opinion, dated Apr. 22, 2014, PCT/US13/53617, filed Aug. 5, 2013.
Advisory Action dated Jun. 23, 2014, U.S. Appl. No. 13/571,348, filed Aug. 10, 2012.
Faipp Pre-Interview Communication dated Aug. 4, 2014, U.S. Appl. No. 13/844,357, filed Mar. 15, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
FAIPP Pre-Interview Communication dated Aug. 6, 2014, U.S. Appl. No. 13/831,486, filed Mar. 14, 2013.
Foreign Communication from a Related Counterpart—International Search Report and Written Opinion, dated Jul. 11, 2014, PCT/US14/16651, filed Feb. 16, 2014.

* cited by examiner

US 8,863,252 B1

TRUSTED ACCESS TO THIRD PARTY APPLICATIONS SYSTEMS AND METHODS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications may carry a wide variety of content, for example electronic mail, medical records, financial transactions, and other confidential information. The electronic communications may travel for some of the communication end-to-end path over unsecured communication links where the content may be subject to tampering or intrusion. A variety of security measures have been applied to provide increased security and to raise the level of difficulty for nefarious actors attempting to access the confidential information. Applications are sometimes uploaded to computing platforms and/or communication devices from sources that make no warranty of the integrity of the applications. For example, sometimes individual application developers may upload an application that they offer for free or for a purchase price to the source, such as an application repository. These applications may be deliberately or unknowingly infected with malware. When one of these applications is downloaded to a computing platform and/or a mobile communication device, the computing platform and/or the mobile communication device may have a negative experience because of malware carried in the downloaded application.

SUMMARY

In an embodiment, a method of downloading trusted content is disclosed. The method comprises sending by a mobile device a request for a trusted content to a server, wherein the mobile device comprises a first mobile device trusted security zone and builds the request while executing in the first mobile device trusted security zone and wherein the server comprises a server trusted security zone and handles the request for the trusted content at least partly in the server trusted security zone. The method further comprises receiving the trusted content by the first mobile device trusted security zone, storing the trusted content in a second mobile device trusted security zone of the mobile device, and inspecting the trusted content in the second mobile device trusted security zone. When the trusted content passes inspection, the method further comprises at least one of executing at least a portion of the trusted content by the first mobile device trusted security zone or presenting at least a portion of the trusted content by the first mobile device trusted security zone.

In an embodiment, a method of transmitting trusted content is disclosed. The method comprises receiving a content, wherein the content designates trusted execution and based on the designation for trusted execution, executing a browser plug-in in a trusted security zone, wherein when the browser plug-in executes in the trusted security zone, applications are prevented from executing in the normal security zone. The method further comprises translating a form content of the content to a trusted form content by the browser plug-in, presenting the trusted form on a display by the browser plug-in, receiving user input directed to the trusted form from a user interface by the browser plug-in, and transmitting the user input to complete a confidential transaction.

In an embodiment, a trusted application marketplace is disclosed. The trusted application market place comprises a processor having a trusted security zone, a memory, and an application stored in the memory. When executed in the trusted security zone of the processor the application receives a trusted application and trust credentials associated with the trusted application and validates the trust credentials associated with the trusted application. When the trust credentials associated with the trusted application are deemed valid, the application stores the trusted application in the memory. The application further receives a request for the trusted application and trust credentials associated with the request, validates the trust credentials associated with the request, and when the trust credentials associated with the request are deemed valid, sends the trusted application to the requesting device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
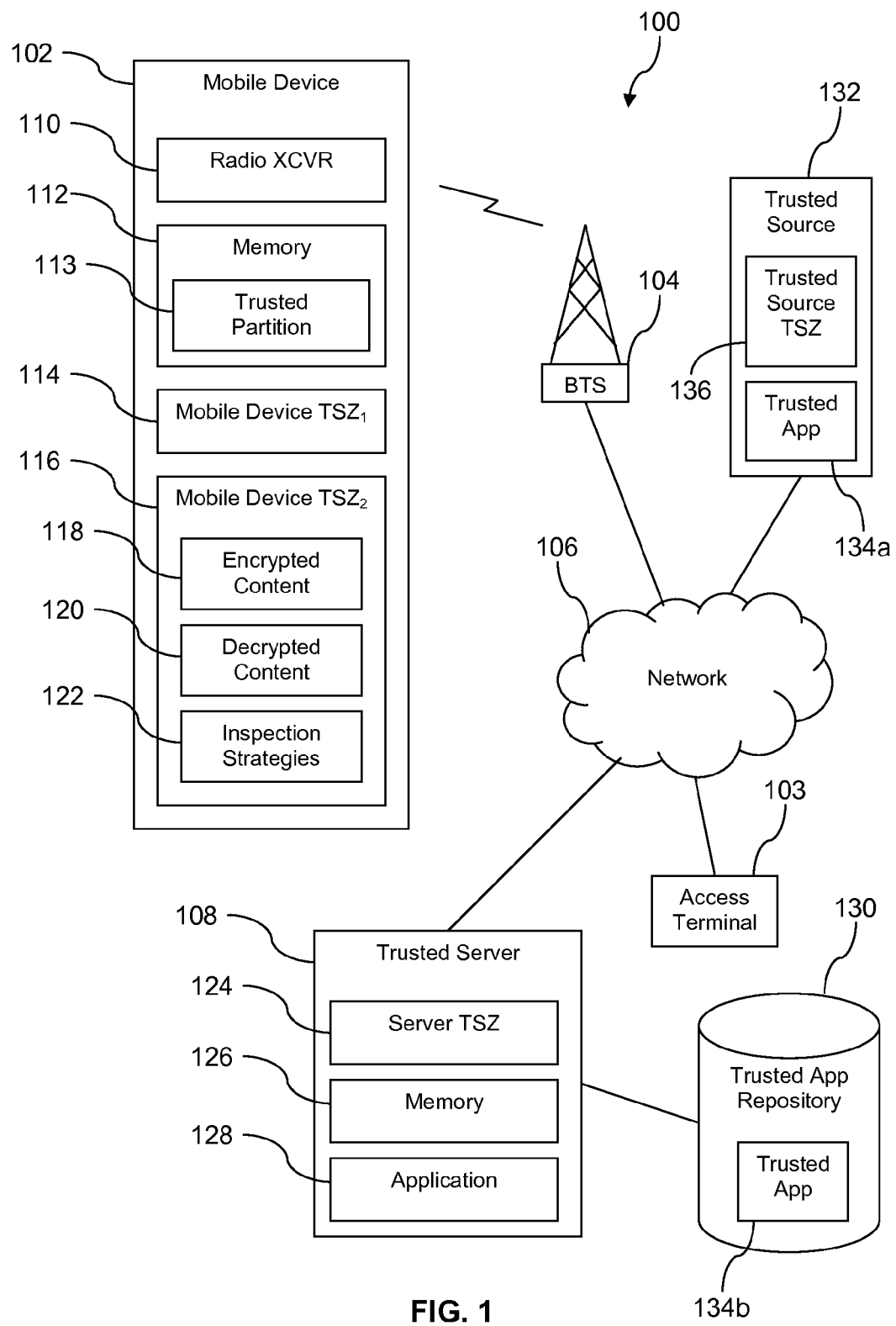
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Systems and methods are taught herein that may be used collaboratively or separately to increase the trust of applications downloaded to computing devices from application repositories. The systems and methods may also be used to promote trusted presentation of sensitive and/or confidential information. A trusted application, for example a computer program, may be uploaded to a repository of trusted applications. The trusted application may be transmitted to a server computer that manages the repository of trusted applications to maintain the trusted state of those trusted applications. In some contexts, the server may be said to provide a trusted application marketplace and/or a trusted marketplace. The trusted application may be sent by a computer, a developer, or a corporation that is qualified to provide trusted applications. In some contexts, a trusted application provided by a developer or a corporation may be referred to as a third party application. To prevent tampering, the trusted application may be transmitted to the server via a trusted end-to-end communication link. A communication tool executing in a trusted security zone of a sending device may transmit the trusted application along with a trust credential that promotes verification of the trust of the trusted application by the receiving device, for example the server. A communication tool executing in a trusted security zone of the server verifies the trust of the transmitted trusted application by inspecting or analyzing the one or more trust credentials received with the trusted application. When the trust of the trusted application is verified or confirmed, the server may store the trusted application in the repository.

When a request to download the trusted application is received from a device, the server may confirm that the requesting device is executing in a trusted security zone of the device. The server may then send the trusted application along with one or more trust credentials to the requesting device. The trust credentials may include one or more trust tokens confirming the trusted sending of the application from the developer to the server, for example the sending of the application over a trusted end-to-end communication link. The trust tokens may also include one or more tokens confirming that the server sent the application when executing in the trusted security zone of the server. Additional trust tokens may be accumulated as the trusted application transits a trusted end-to-end communication link, for example a trust token may be contributed by the trusted security zone of each transited network node in the trusted end-to-end communication link. The trust credentials may further include information about the handling of the trusted application, for example the handling by a developer and/or provider of the trusted application and the handling by the server. Alternatively, a plurality of trust credentials and/or trust reports may be accumulated in a single trust token or a relatively small number of trust tokens. The trust token or trust tokens may be viewed as a kind of birth certificate or pedigree of the application. In an embodiment, at any point in the end-to-end path from the developer to the repository and from the repository to the end user the continuity of trust of the subject application can be walked back using the trust token or trust tokens to determine if the application can be trusted, for example to be trusted to be free of malware introduced after leaving the developer's hands.

The requesting device may establish a provisional trusted security zone in which to receive the trusted application. If the trusted application is encrypted, the requesting device decrypts the trusted application in the provisional trusted security zone. Once decrypted, the provisional trusted security zone may detect that the trusted application is corrupted or carries malware, in which case the decrypted trusted application is removed. The trusted application may be transmitted with and/or may encapsulate a manifest defining the computing resources that the trusted application proposes to access. If the requesting device is configured to prevent access by applications to some of the computing resources, the trusted application may be removed or prevented from executing.

The trusted application may carry a checksum or a cyclic redundancy check (CRC) number that can be used to determine if the trusted application has been altered. The provisional trusted security zone may confirm the checksum or CRC carried with the trusted application agrees with the corresponding checksum or CRC number calculated over the trusted application by the provisional trusted security zone. As would be appreciated by one skilled in the art, if the trusted application has been modified and/or corrupted, the checksum or CRC transmitted with the application is unlikely to match the checksum or CRC calculated over the application at the end use point, for example at the requesting device, and the application can be deleted or otherwise quarantined to avoid harm to the requesting device. The provisional trusted security zone may perform one or more virus scans of the trusted application. The provisional trusted security zone may execute the trusted application to determine if it attempts to access computing resources that are not identified in the manifest. Based on these tests, checks, and trials, the provisional trusted security zone may determine that the trusted application retains the trusted state.

If the trusted application passes these inspections and is deemed to remain in a trusted state, the provisional trusted security zone may copy the trusted application to the memory of the requesting device, for example a mobile phone. The trusted application may be copied to a trusted memory partition. Alternatively, the trusted application may be copied to a normal memory partition but the checksum or CRC number of the trusted application may be copied to the trusted memory partition. Before executing a trusted application stored in the normal memory partition, a trusted security zone of the requesting device may confirm that the trusted application still matches the checksum and/or CRC number.

In an embodiment, a browser plug-in that is configured to work with a plurality of browsers is invoked when trusted content is accessed by a browser on a device. The browser plug-in executes in a trusted security zone of the device, and other non-trusted applications are prevented from accessing the content handled by the browser plug-in and are prevented from accessing the memory of the user interfaces of the device while the trusted security zone is executing instructions. In this way trusted content, for example medical records, medical diagnostic reports or information, medical treatment regimens, and the like, may be prevented from being screen scraped, monitored, or otherwise captured by malware that may be present on the device.

If the browser of the device accesses a content that encapsulates a form requesting confidential information, such as an on-line purchase form that requests a credit card number and/or authentication information, the browser may invoke the browser plug-in, and the browser plug-in may create a copy of the form input screen. The browser plug-in presents the form input screen to a user of the device and receives the user's input. The browser plug-in may execute in the trusted security zone, thereby preventing untrusted applications from executing and possibly spying on or otherwise capturing the information that a user inputs into the form input screen. The browser plug-in may encrypt the user input and provide this to the browser to send to the on-line store. Alternatively, the browser plug-in may send the user input to the on-line store.

It will be appreciated that these several techniques may be used singly or in combination with each other to promote trusted access from a mobile device, for example, from a mobile phone to trusted content. The continuity of trust among the several actors in the system—a trusted source of a trusted application, a trusted marketplace for selling and/or distributing the trusted application, and a mobile device that requests, receives, and verifies the trusted application in a trusted security zone—can promote the trust that is vital to robust propagation of applications that interwork with sensitive information.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For further details concerning trusted end-to-end communication links, see U.S. patent application Ser. No. 13/532,588, filed Jun. 25, 2012, "End-to-End Trusted Communication Infrastructure," by Leo Michael McRoberts, et al., which is incorporated herein by reference in its entirely. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a communication system 100 is described. In an embodiment, the system 100 comprises a mobile device 102, a base transceiver station (BTS) 104, a network 106, and a trusted server 108. The base transceiver station 104 and the trusted server 108 are communicatively coupled to the network 106. The base transceiver station 104 provides a wireless communication link to couple the mobile device 102 to the network 106. While a single base transceiver station 104 is shown in FIG. 1, it is understood that the system 100 may comprise any number of base transceiver stations 104 and any number of mobile devices 102. The trusted server 108 may be a computer system. Computer systems are described further hereinafter.

The base transceiver station 104 and the mobile device 102 may communicate over a wireless link according to one or more of a code division multiple access (CDMA) wireless protocol, a global system for mobile communication (GSM) wireless protocol, a long-term evolution (LTE) wireless protocol, a worldwide interoperability for microwave access (WiMAX) wireless protocol, or another wireless protocol. The network 106 may comprise one or more private networks, one or more public networks, or a combination thereof. The mobile device 102 may access the trusted server 108 via the base transceiver station 104 and the network 106 to download a trusted application from a trusted application repository 130 maintained by the trusted server 108. In an embodiment, the system 100 may comprise an access terminal 103 that is communicatively coupled to the network 106 via one or more wired communication links. The access terminal 103 may share many of the trust-related features of the mobile device 102 that will be discussed further below.

In an embodiment, the mobile device 102 comprises a radio transceiver 110, a memory 112 having a trusted partition 113, and a first mobile device trusted security zone 114. Under some conditions, to be discussed further below, the mobile device 102 may dynamically establish a second mobile device trusted security zone 116, for example executing in a virtual processor of the mobile device 102 allocated for the second mobile device trusted security zone 116. Alternatively, in an embodiment, the mobile device 102 may have a plurality of pre-configured or statically configured trusted security zones 114, 116. The radio transceiver 110 may collaborate with the base transceiver station 104 to establish a wireless communication link between the mobile device 102 and the base transceiver station 104. The mobile device 102 may comprise a mobile phone, a personal digital assistant, a media player, a radio frequency wireless enabled laptop computer, a radio frequency wireless enabled notebook computer, a wireless enabled tablet computer, or other electronic device enabled to conduct mobile radio frequency communication.

The trusted server 108 may comprise a server trusted security zone 124, a memory 126, and an application 128. In some contexts, the trusted server 108 may be referred to as a trusted application marketplace or may be said to provide a trusted application marketplace. The application 128 may execute in the server trusted security zone 124. A developer of trusted applications, for example a trusted source 132, may send a trusted application 134a to the trusted server 108 for uploading to the trusted application repository 130 as trusted application 134b. In an embodiment, the trusted source 132 may be a computer system. The trusted application 134 may be free software or a free application that the developer has developed and is donating to the public. Alternatively, the trusted application 134 may be a premium application that the trusted source 132 may be paid for providing by the operator of the trusted server 108, for example, the proprietor of a trusted application marketplace, or may be paid for by the user of the mobile device 102.

The application 128 executing in the server trusted security zone 124 may receive the trusted application 134a sent by the trusted source 132 along with one or more trust credentials. The trust credentials may include one or more trust tokens confirming the trusted sending of the trusted application 134a from the trusted source 132 to the server 108, for example the sending of the trusted application 134a over a trusted end-to-end communication link. The trust tokens may also include one or more tokens confirming that the trusted server 108 sent the trusted application 134b when executing in the server trusted security zone 124. Additional trust tokens may be accumulated as the trusted application 134 transits a trusted end-to-end communication link, for example a trust token may be contributed by the trusted security zone of each transited network node in the trusted end-to-end communication link. The trust credentials may further include information about the handling of the trusted application 134 by the trusted source 132 and the handling by the trusted server 108, for example storing the trusted application 134b in the trusted application repository 130 and permitting no access to the trusted application repository 130 except to an application executing in the server trusted security zone 124.

In an embodiment, the trusted source 132 executes the communication application used to send the trusted application 134a to the trusted server 108 in a trusted source trusted security zone 136. The information in the trust token and/or trust credentials may establish that the communication encapsulating the trusted application 134a was generated by a communication application executing in the trusted source trusted security zone 136 of the trusted source 132.

The application 128 executing in the server trusted security zone 124 may inspect or verify the trust credentials transmitted with the trusted application 134a by the trusted source 132. The application 128 inspecting or verifying the trust credentials may comprise comparing the trust credentials and/or trust tokens to a predefined trust criterion. If the application 128 can confirm, based on analyzing the trust credentials, that the trusted application 134a is accompanied by any desired trust credentials and/or that the trust credentials and/or trust tokens satisfy the predefined trust criterion, the application 128 may store the trusted application 134a in the trusted application repository 130 as trusted application 134b. For further details concerning trusted end-to-end communication links, see U.S. patent application Ser. No. 13/532,588, filed Jun. 25, 2012, "End-to-End Trusted Communication Infrastructure," by Leo Michael McRoberts, et al., which was incorporated by reference above. If the application 128 does not confirm that the trusted application 134a is accompanied by the desired trust credentials, the application 128 may discard or erase the trusted application 134a. In this case, the application 128 may send a notification or explanatory message to the trusted source 132.

In an embodiment, a register of trusted sources may be maintained, and applications may not be accepted for uploading to the trusted application repository 130 from sources that are not registered as trusted sources. Becoming registered as a trusted source may involve one or more of certifying a trusted application development process, certifying a trusted application configuration control process, a certification of an application developer employee scrutiny process, and other verifications. The register of trusted sources may be maintained by a disinterested party that is not engaged in distributing and/or marketing trusted applications to end users.

In an embodiment, access to the trusted application repository 130 may be restricted to an application, for example application 128, executing in the server trusted security zone 124 or another trusted security zone of the trusted server 108. The trusted application repository 130 may comprise a data store or a plurality of data stores. In an embodiment, the trusted application repository 130 may comprise one or more data base servers that mediate access to mass storage containing the trusted applications. In an embodiment, the data base server or servers may handle requests from the application 128 to access a data base in a trusted security zone of the subject server or servers. In an embodiment, the trust tokens and/or the trust credentials may comprise information that provides a record of the handling and/or the development of the trusted application 134b that promotes establishing that the trusted application 134a was developed, stored, and/or tested according to documented procedures that maintain the integrity of the trusted application 134a.

The mobile device 102 may request to download the trusted application 134b from the trusted server 108. The mobile device 102 may build a request for the trusted application 134b and send the request for the trusted application 134b while executing in the first mobile device trusted security zone 114. The mobile device 102 may complete a payment transaction session with the trusted server 108. Alternatively, the trusted application 134b may be free, in which case no payment transaction session may occur. The payment transaction may be performed before the trusted application 134b is sent to the mobile device 102 or after the trusted application 134b has been validated, as described further below. The request sent by the mobile device 102 may comprise an identification of the trusted application 134b that is requested as well as one or more trust tokens. The request may be sent by the mobile device 102 over a trusted end-to-end communication link, and the request may accumulate additional trust tokens in passing through one or more trusted security zones of communication nodes that compose the trusted end-to-end communication link.

The application 128 executing in the server trusted security zone 124 of the trusted server 108 handles the request to download the trusted application 134b sent by the mobile device 102. The application 128 may verify or inspect the trust tokens that are carried with the request from the mobile device 102. For example, the application 128 may verify that the download request was sent from a trusted security zone, for example from the first mobile device trusted security zone 114 of the mobile device 102. The application 128 may further verify, based on analyzing the trust tokens, that the mobile device 102 has not been rooted or otherwise compromised. One skilled in the art appreciates that the term "rooted" and/or "rooting" a mobile device may refer to obtaining privileged control access to powerful operating system commands that may promote alteration or replacement of settings and or security features of the mobile device. If verification succeeds, the application 128 retrieves the trusted application 134b from the trusted application repository 130, builds one or more trust credentials associated with the handling of the trusted application 134b, and sends the trusted application 134b and trust credentials to the mobile device 102 over a trusted end-to-end communication link.

The trusted application and trust credentials received by the mobile device 102 may be received by the first mobile device trusted security zone 114 and initially stored in the second mobile device trusted security zone 116 to promote inspection of this information in a separate trusted security zone where any malware present in the trusted application 134b may not readily cause harm to the first mobile device trusted security zone 114. In some contexts, the second mobile device trusted security zone 116 may be referred to or considered as a sacrificial trusted security zone. In an embodiment, the second mobile device trusted security zone 116 may be constructed and/or allocated on-the-fly when a trusted application is requested to be downloaded. For example, when a requested trusted application is received, the mobile device 102 may allocate the second mobile device trusted security zone 116 in a virtual processor of the mobile device 102. As is known to those of skill in the art, when using virtualization execution tools, a virtual processor may be constructed and/or allocated on-the-fly, and a process may be launched to execute in this virtual processor. When the second mobile device trusted security zone 116 has completed inspection of the trusted application 134b and the trust credentials, the trusted application 134b may be stored in the memory 112 and/or in the trusted memory partition 113, and the second mobile device trusted security zone 116 may be destroyed. Alternatively, the second mobile device trusted security zone 116 may be erased. Alternatively, the second mobile device trusted security zone 116 may remain on the mobile device 102.

The trusted application may be stored as encrypted content 118. After the trusted application is decrypted, it may be stored as decrypted content 120. The decrypted content 120 may be inspected and/or tested according to inspection strategies 122.

The second mobile device trusted security zone 116 may compare the trust credentials and/or trust credentials received to a predefined trust criterion. If the predefined trust criterion is not satisfied, the second mobile device trusted security zone 116 discards the trusted application. The second mobile device trusted security zone 116 may perform a checksum over the trusted application 134b and compare this to a checksum provided with the trusted application 134b or the trust credentials. If the calculated checksum does not compare to the downloaded checksum, the second mobile device trusted security zone 116 may discard or delete the trusted application 134b. The second mobile device trusted security zone 116 may present a message on a display of the mobile device 102 indicating that the trusted application 134b failed inspection and possibly indicating the nature of the failure. Alternatively, a cyclic redundancy check may be calculated over the trusted application 134b and compared to a downloaded cyclic redundancy check number, and the trusted application 134b may be discarded if the numbers do not compare. The second mobile device trusted security zone 116 may perform a virus scan of the trusted application 134b. If a virus is detected by the virus scan, the second mobile device trusted security zone 116 may discard the trusted application 134b and/or present a notification on a display of the mobile device 102.

In an embodiment, the trusted application 134b may be accompanied by a manifest or other document that enumerates the system resources that the trusted application 134b will attempt to use. The manifest may indicate if the trusted application 134b will attempt to access the network 106, to write to the memory 112, to write over other applications, to send email, and other functions. In an embodiment, the manifest along with a checksum or CRC may be transmitted in an encrypted form. The manifest and the checksum or CRC may be decrypted and its integrity verified by calculating a checksum or CRC over the manifest and comparing to the checksum or CRC transmitted with the manifest. The second mobile device trusted security zone 116 may execute the trusted application 134b while monitoring the resources the trusted application 134b in fact attempts to use. If the trusted application 134b attempts to use any resources that are not identified in the manifest, the trusted application 134b may be deemed to fail inspection and be discarded and/or deleted. The trusted application 134b may be inspected and tested according to inspection strategies 122. The inspection strategies 122 may be stored in the trusted partition 113 and copied to the second mobile device trusted security zone 116 when it is dynamically created. Alternatively, the inspection strategies 122 may be downloaded with the trusted application 134b from the trusted server 108. In an embodiment, the inspection strategies 122 may be defined by the trusted source 132 and/or the developer of the trusted application 134a.

If the trusted application 134b passes inspection, the second mobile device trusted security zone 116 may copy the trusted application 134b to the memory 112 and/or to the trusted memory partition 113. In an embodiment, a checksum or a cyclic redundancy check number associated with the trusted application 134b may be stored in the trusted memory partition 113. This may permit verifying the integrity of the trusted application 134b that may be stored in the memory 112 before executing the trusted application 134b by recalculating the checksum or the cyclic redundancy check number over the trusted application 134b and comparing to the stored checksum or cyclic redundancy number. In an embodiment, the second mobile device trusted security zone 116 may store a data segment of the trusted application 134b in the trusted partition 113 of the memory 112. As is known to those skilled in the art, an application and/or computer program stored in memory may be segregated into an executable instructions segment or code segment, a data segment, and possibly a stack. The data segment may comprise one or more of global variables, static variables, uninitialized data (also known as BSS segment), and a heap area. It may be that in some trusted applications 134 the data segment may comprise some confidential information that it is desired to maintain in confidence, for example personal data and/or financial data. In an embodiment, the entirety of the trusted application 134 may be stored in the trusted memory partition 113.

The first mobile device trusted security zone 114, the second mobile device trusted security zone 116, the server trusted security zone 124, and the trusted source trusted security zone 136 may be substantially similar to trusted security zones. The trusted security zones 114, 116, 124, 136 may differ from each other in size, in memory allocation, in software that each may store, in duration in time, but each is similar in providing what may be conceptualized as hardware assisted security, as described before the introduction of FIG. 1 above.

Figure 2:
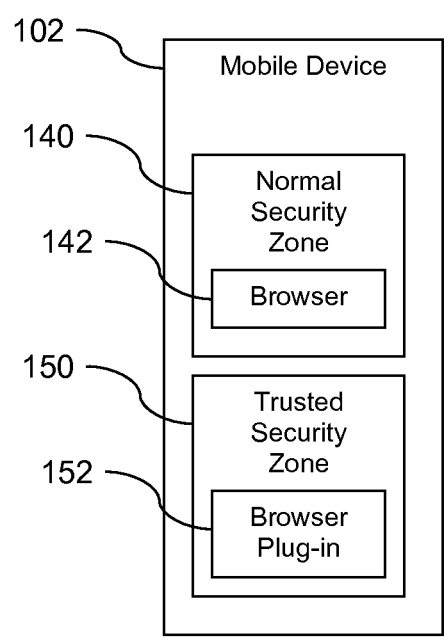
FIG. 2. is an illustration of some components of a mobile device according to an embodiment of the disclosure.

Turning now to FIG. 2, further details of an embodiment of the mobile device 102 are described. In an embodiment, the mobile device 102 may comprise a normal security zone 140 that executes a browser 142 and a trusted security zone 150 that executes a browser plug-in 152. When the browser 142 receives a requested document that is designated as a trusted document or as trusted content, the browser 142 may invoke the browser plug-in 152 to handle the trusted document, without the browser 142 further processing the trusted document. In an embodiment, the trusted status of the trusted document may be indicated in a document header that can be read without reading or accessing any of the trusted document. Alternatively the trusted status of the trusted document may be indicated in another way. In an embodiment, the trusted status of the trusted document may be indicated by a handshaking session that precedes the downloading of the subject trusted document. It is understood that the browser plug-in 152 may be configured to interoperate with a plurality of different browsers 142. It is known that different users of mobile device 102 may prefer to install and use different browsers to access and use content.

While the browser plug-in 152 executes in the trusted security zone 150, other applications are prevented from executing and are prevented from accessing memory and/or other interfaces of the mobile device 102. This may prevent malware encapsulated in these other applications from monitoring and/or spying on the inputs or outputs of the interfaces and also from writing to the interfaces. The browser plug-in 152 may present information on a display of the mobile device 102, for example confidential medical information such as medical records, diagnostic imaging, diagnostic test results, medical treatment regimens, and the like. The browser plug-in 152 may determine that an input form is contained in the trusted content and is provided for a user to input confidential information, for example personal information and/or financial information. The browser plug-in 152 may save the portion of the trusted document in the trusted memory partition 113. As inputs are received from the interfaces of the mobile device 102, the browser plug-in 152 populates the input into the form portion of the trusted content. In an embodiment, the browser plug-in 152 may encrypt the filled in form information and provide the encrypted document portion back to the browser 142, and the browser 142 may send the document encapsulating the encrypted document portion back to a server coupled to the network 106, for example an electronic commerce web site or a medical services web site.

Figure 3:
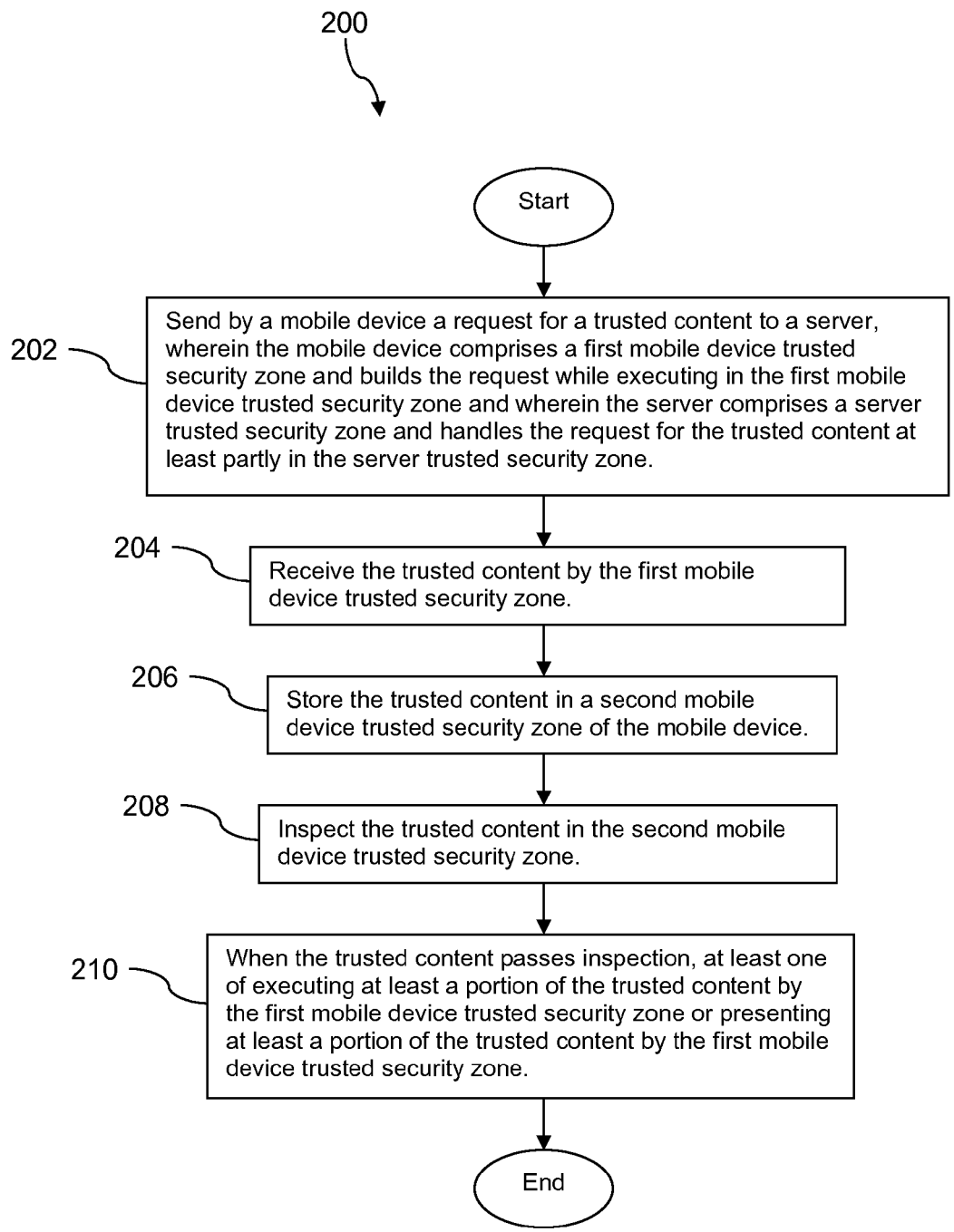
FIG. 3 is a flow chart of a method according to an embodiment of the disclosure.

Turning now to FIG. 3, a method 200 is described. At block 202, a mobile device sends a request for a trusted content to the trusted server 108, wherein the mobile device comprises a first mobile device trusted security zone and builds the request while executing in the first mobile device trusted security zone and wherein the server comprises a server trusted security zone and handles the request for the trusted content at least partly in the server trusted security zone. At block 204, the trusted content is received by the first mobile device trusted security zone of the mobile device. At block 206, the trusted content is stored in a second mobile device trusted security zone of the mobile device. At block 208, the trusted content is inspected in the second mobile device trusted security zone. At block 210, when the trusted content passes inspection, at least a portion of the trusted content is executed by the first mobile device trusted security zone or at least a portion of the trusted content is presented by the first mobile device trusted security zone.

Figure 4:
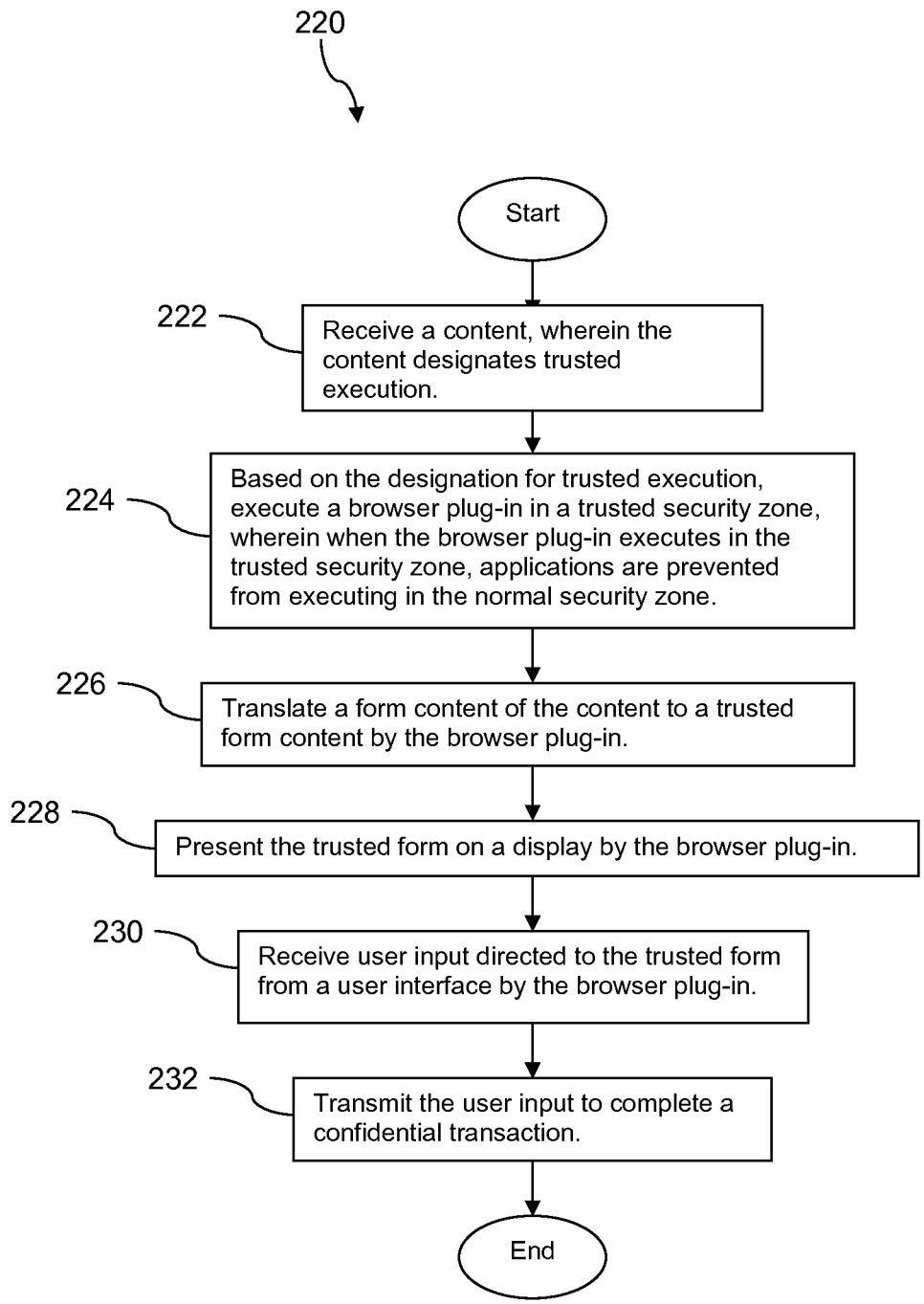
FIG. 4 is a flow chart of another method according to an embodiment of the disclosure.

Turning now to FIG. 4, a method 220 is described. At block 222, content is received, wherein the content designates a trusted execution status. In an embodiment, the content comprises a hypertext markup language (HTML) document or an extensible markup language (XML) document. At block 224, based on the designation for trusted execution, a browser plug-in is executed in a trusted security zone, wherein when the browser plug-in executes in the trusted security zone, applications are prevented from executing in the normal security zone. At block 226, a form content is translated to a trusted form content by the browser plug-in. At block 228, the trusted form is presented on a display by the browser plug-in. At block 230, user input directed to the trusted form is received from a user interface by the browser plug-in. At block 232, the user input is transmitted to complete a confidential transaction. It is understood that the descriptions of the methods and systems for trusted access to applications and to content may also apply, with appropriate modifications, to the access terminal 103, for example taking into account that the access terminal 103 does not have a radio transceiver 110 and is coupled to the network 106 via a wired connection instead of via a wireless communication link via the base transceiver station 104.

Figure 5:
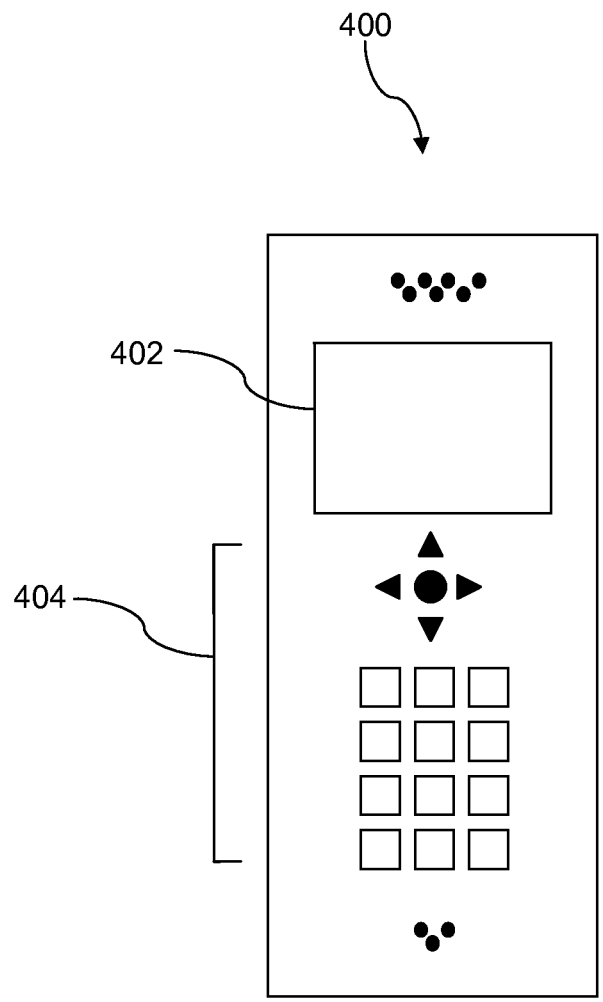
FIG. 5 is an illustration of a mobile phone according to an embodiment of the disclosure.

FIG. 5 depicts the mobile device 400, which is operable for implementing aspects of the present disclosure, but the present disclosure should not be limited to these implementations. The mobile device 400 may be implemented in a form substantially similar to that of the mobile device 400 described below. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
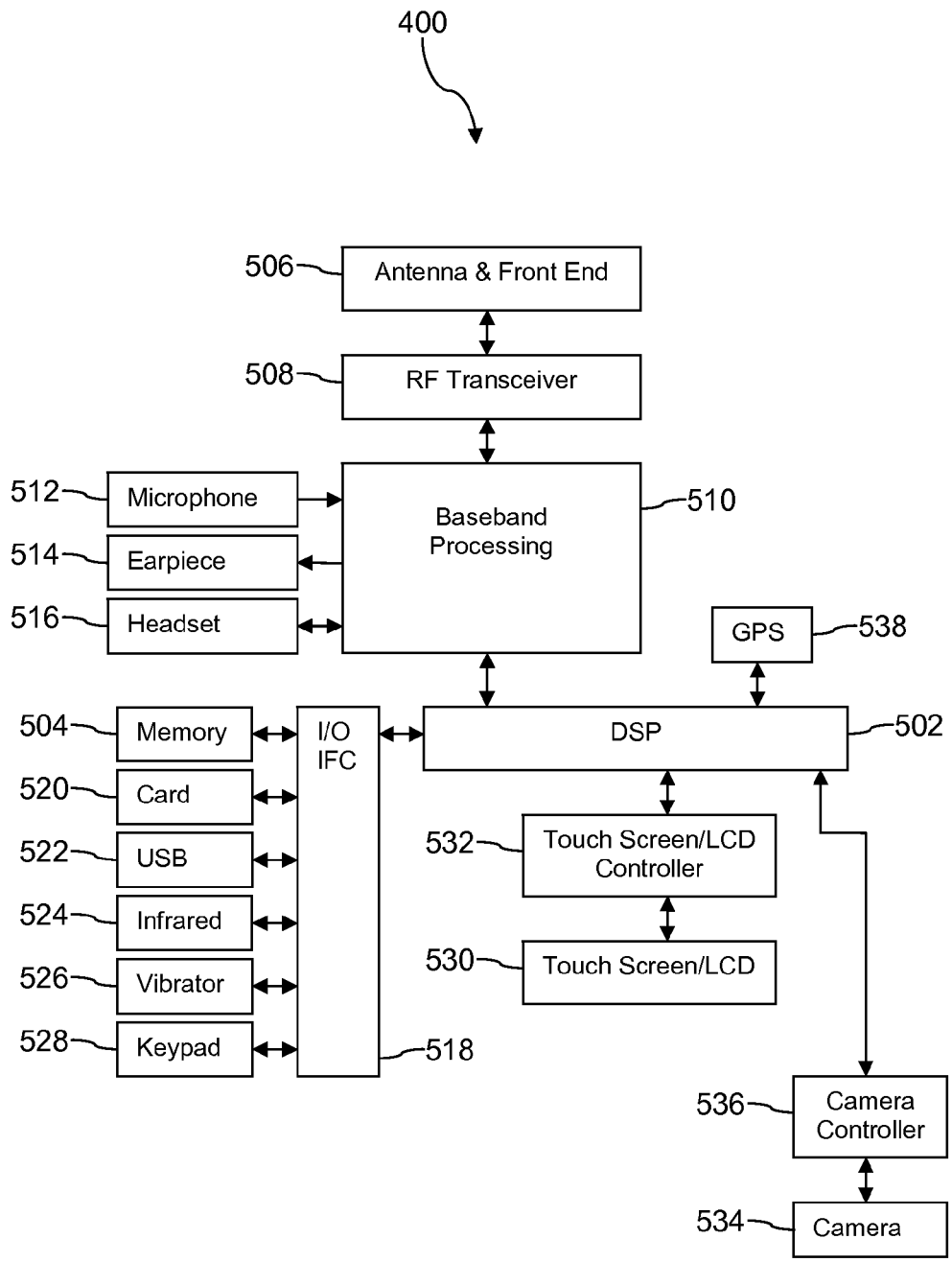
FIG. 6 is a block diagram of a mobile phone according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
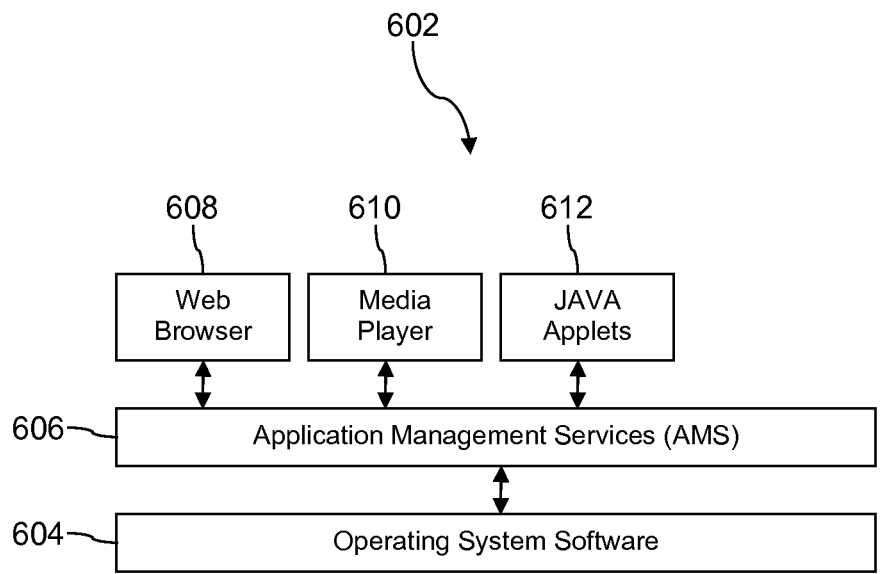
FIG. 7A is an illustration of a software architecture for a mobile phone according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
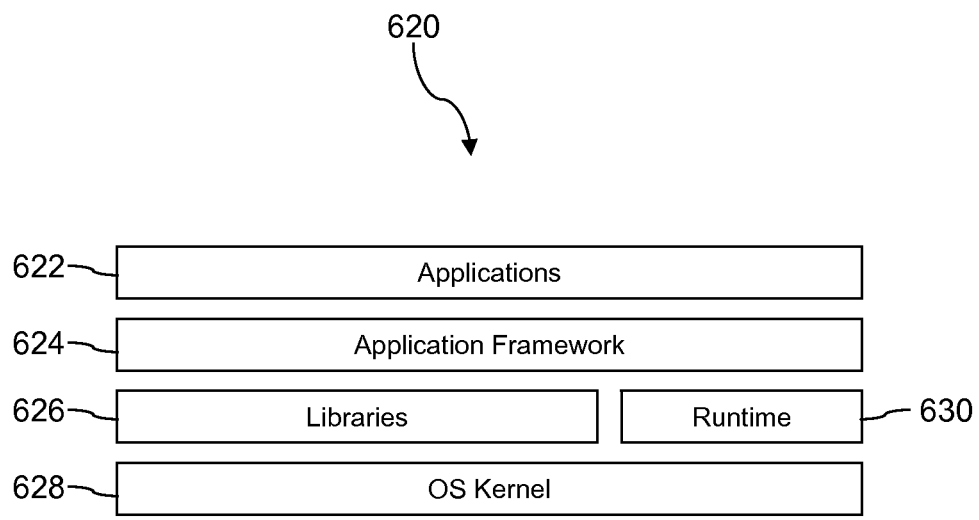
FIG. 7B is an illustration of another software architecture for a mobile phone according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
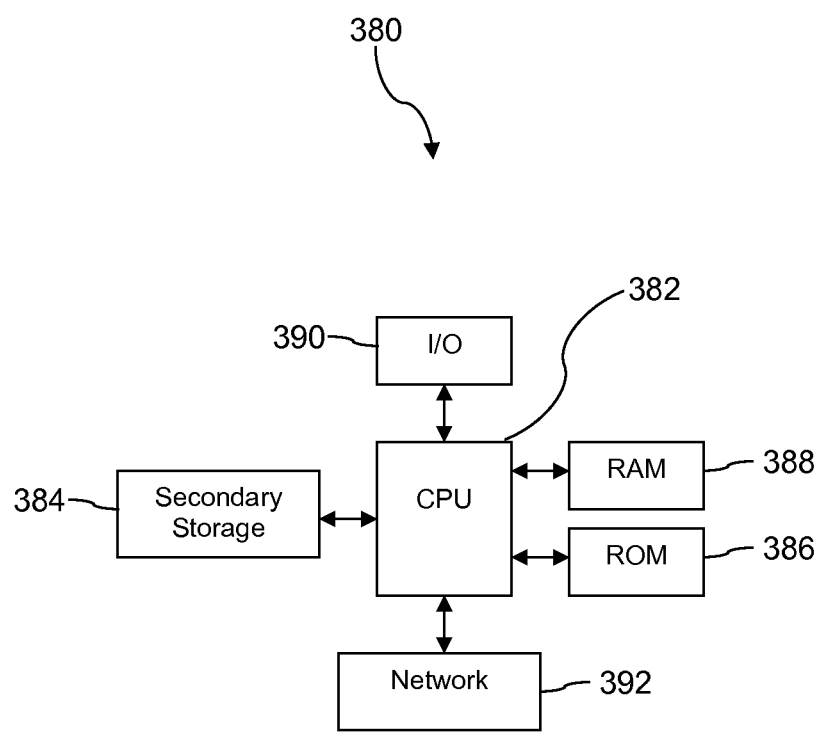
FIG. 8 is an illustration of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of downloading trusted content, comprising:
   building a request for a trusted content while executing in a secure partition of a first mobile device trusted security zone of a mobile device;
   responsive to executing in the secure partition of the first mobile device trusted security zone, stopping execution of a normal partition of the mobile device;
   sending, by the mobile device, the request for the trusted content to a server, wherein the server comprises a server trusted security zone that at least partly handles the request for the trusted content;
   receiving, by the first mobile device trusted security zone, the trusted content, wherein the trusted content comprises a trust token that contains information about the server trusted security zone and about the transmission of the trusted content;
   storing the trusted content in a second mobile device trusted security zone of the mobile device;
   inspecting the trusted content in the second mobile device trusted security zone, wherein inspecting the trusted content in the second mobile device trusted security zone comprises analyzing the trust token and comparing the trust token to a predefined trust criterion; and
   responsive to the trusted content passing inspection, at least one of executing at least a portion of the trusted content by the first mobile device trusted security zone or presenting at least a portion of the trusted content by the first mobile device trusted security zone on a display of the mobile device.

2. The method of claim 1, further comprising creating the second mobile device trusted security zone in response to receiving the trusted content by the first mobile device trusted security zone, wherein the second mobile device trusted security zone is provided in a virtual processor of the mobile device.

3. The method of claim 1, wherein inspecting the trusted content in the second mobile device trusted security zone comprises decrypting the trusted content in the second mobile device trusted security zone.

4. The method of claim 1, wherein inspecting the trusted content in the second mobile device trusted security zone comprises at least one of scanning at least part of the trusted content with a virus scanning tool, performing a cyclic redundancy check on at least part of the trusted content, performing a checksum on at least a part of the trusted content, and executing instructions contained in the trusted content and comparing the execution behavior of the executed instructions to a manifest provided in the trusted content.

5. The method of claim 1, further comprising responsive to the trusted content passing inspection, storing at least a portion of the trusted content in a trusted memory partition of the mobile device.

6. The method of claim 5, wherein one of a cyclic redundancy check data provided in the trusted content or a checksum data provided in the trusted content is stored in the trusted memory partition of the mobile device.

7. The method of claim 5, wherein a data segment portion of the trusted content is stored in the trusted memory partition of the mobile device.

8. The method of claim 1, further comprising:
receiving a second trusted content, wherein the second trusted content designates trusted execution;
based on the designation for trusted execution of the second trusted content, executing a browser plug-in in a trusted security zone of the mobile device, wherein responsive to the browser plug-in executing in the trusted security zone of the mobile device, applications are prevented from executing in the normal partition;
translating, by the browser plug-in, a form content of the second trusted content to a trusted form content;
presenting, by the browser plug-in, the trusted form content on a display of the mobile device;
receiving, by the browser plug-in, user input directed to the trusted form content from a user interface; and
transmitting the user input to complete a confidential transaction.

9. The method of claim 8, wherein the browser plug-in is configured for use with a plurality of different browser applications.

10. The method of claim 8, wherein the form content is received as part of one of a hypertext markup language (HTML) document or an extensible markup language (XML) document.

11. The method of claim 8, further comprising:
encrypting, by the browser plug-in, the user input; and
providing, by the browser plug-in, the encrypted user input to a browser executing in the normal partition, wherein the browser transmits the encrypted user input to complete the confidential transaction.

12. The method of claim 8, further comprising encrypting, by the browser plug-in, the user input, wherein the browser plug-in transmits the encrypted user input to complete the confidential transaction.

13. The method of claim 8, further comprising presenting, by the browser plug-in, at least a portion of the content on a display of the mobile device, wherein the portion of the content comprises at least one of a medical record, medical diagnostic information, or medical treatment information.

14. The method of claim 1, further comprising:
receiving, by the server, the trusted content and trust credentials associated with the trusted content;
validating, by the server, the trust credentials associated with the trusted content;
when the trust credentials associated with the trusted content are deemed valid, storing the trusted content;
receiving, by the server, the request for the trusted content and trust credentials associated with the request;
validating, by the server, the trust credentials associated with the request; and
when the trust credentials associated with the request are deemed valid, sending, by the server, the trusted content to the mobile device.

15. The method of claim 14, wherein the trust credentials associated with the trusted content comprise a trust token that contains information about a trusted end-to-end communication link by which the trusted content was received by the server.

16. The method of claim 14, wherein the trust credentials associated with the trusted content further comprises information that promotes validating the integrity of the trusted content.

17. The method of claim 14, wherein the server sends the trusted content to the mobile device via a trusted end-to-end communication link.

18. The method of claim 14, wherein the server stores the trusted content and the trust credentials associated with the trusted content.

* * * * *